US008169659B2

(12) United States Patent
Mantell

(10) Patent No.: US 8,169,659 B2
(45) Date of Patent: May 1, 2012

(54) SYSTEMS AND METHODS FOR REDUCING A TRADE-OFF BETWEEN IMAGE QUALITY AND MARKING SPEED

(75) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1388 days.

(21) Appl. No.: 10/778,220

(22) Filed: Feb. 17, 2004

(65) Prior Publication Data

US 2005/0179916 A1 Aug. 18, 2005

(51) Int. Cl.
*G06K 1/00* (2006.01)
*B41J 2/205* (2006.01)

(52) U.S. Cl. .............. 358/1.9; 358/1.2; 347/15; 347/40; 347/43

(58) Field of Classification Search ................... 358/1.9; 347/14, 15, 19, 40, 43
See application file for complete search history.

(56) References Cited

U.S. PATENT DOCUMENTS

| | | | | |
|---|---|---|---|---|
| 5,455,681 | A * | 10/1995 | Ng | 358/3.01 |
| 5,636,032 | A * | 6/1997 | Springett | 358/296 |
| 5,764,254 | A * | 6/1998 | Nicoloff et al. | 347/43 |
| 6,145,950 | A * | 11/2000 | Ohtsuka et al. | 347/15 |
| 6,196,660 | B1 * | 3/2001 | Park | 347/37 |
| 6,325,487 | B1 * | 12/2001 | Mantell | 347/41 |
| 6,783,210 | B2 * | 8/2004 | Takahashi et al. | 347/57 |
| 6,834,927 | B2 * | 12/2004 | Yashima et al. | 347/15 |
| 6,834,929 | B1 * | 12/2004 | Adams et al. | 347/19 |
| 6,856,430 | B1 * | 2/2005 | Gase | 358/1.9 |
| 2002/0196484 | A1 * | 12/2002 | Chang | 358/534 |
| 2003/0007024 | A1 * | 1/2003 | Fujimori | 347/15 |
| 2003/0227502 | A1 * | 12/2003 | Sadasivan et al. | 347/21 |
| 2004/0100645 | A1 * | 5/2004 | Quintana et al. | 358/1.9 |
| 2004/0100646 | A1 * | 5/2004 | Quintana | 358/1.9 |
| 2005/0156960 | A1 * | 7/2005 | Courian et al. | 347/5 |
| 2005/0162703 | A1 * | 7/2005 | Chang | 358/3.03 |

* cited by examiner

*Primary Examiner* — Vincent Rudolph
(74) *Attorney, Agent, or Firm* — Oliff & Berridge, PLC

(57) ABSTRACT

To reduce the trade-off between image quality and marking speed, high-resolution data for an image is evaluated, and an output value is created based on the evaluation of the high-resolution data. The output value has a larger output spacing than the high-resolution data, and approximates an edge of a solid defined by the high-resolution data, but within an output area defined by the larger output spacing.

22 Claims, 5 Drawing Sheets

FIG. 12
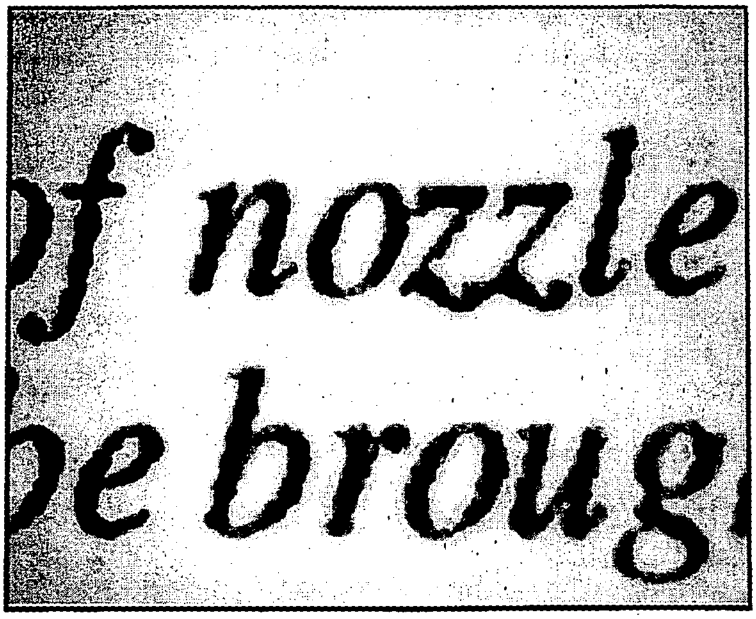
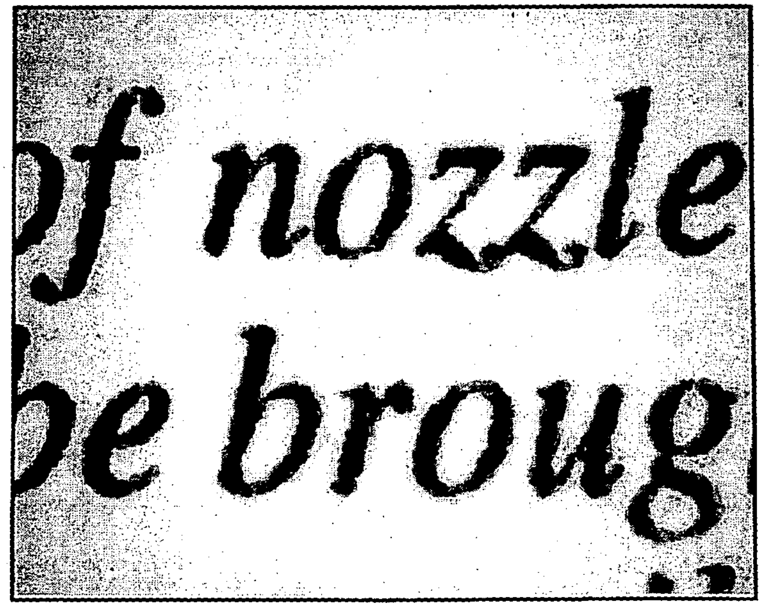
FIG. 13

SYSTEMS AND METHODS FOR REDUCING A TRADE-OFF BETWEEN IMAGE QUALITY AND MARKING SPEED

BACKGROUND OF THE INVENTION

1. Field of Invention

This invention relates to systems and methods for improving marking device speed and/or resolution.

2. Description of Related Art

A common design problem in the field of printing devices is how to increase printing speed without sacrificing image resolution or contrast. Typically, to increase the speed of a printing device, the image resolution of the printing device is lowered. This allows the print head to travel more quickly across each scan line because it does not have to eject ink or toner at as many locations along that scan line. Another conventional method for increasing the speed of a printing device is to decrease the number of times a print head must pass over the same scan line. For instance, when a conventional printing device is utilizing what is popularly called the draft mode, the print head only makes a single pass per scan line, increasing the output speed, but decreasing the image contrast due to the lower amount of ink on the page.

Conventional printing systems utilizing four-color printing (cyan, magenta, yellow, and black) have approached the output speed design problem of increasing black and white printing speed by utilizing "four-color black" printing. In four-color black printing, an amount of cyan, magenta, and yellow are first ejected by the print head and then covered with black. By printing cyan, magenta, and yellow under black, conventional four-color printing systems are able to increase the density of ink ejected in a single scan line pass of the print head. Because the ink is ejected in layers, image defects that result from merely ejecting a large amount of a single color at once do not occur. In this manner, conventional four-color black printing utilizes the increase in output speed that results from single scan line pass printing without sacrificing image contrast.

SUMMARY OF THE INVENTION

However, following the above-described development of four-color black printing, the only remaining method to further increase the speed of black and white printing was to reduce output image resolution. Unfortunately, the resolution can only be lowered so far without the resulting printed image being unsuitable as a final product.

Therefore, various exemplary embodiments of this invention provide systems and methods for reducing the conventional trade-off between output speed and output image resolution in a marking system.

Various exemplary embodiments of this invention provide systems and methods that utilize higher resolution data to adjust the amount of ink, toner or other marking material that will be printed at the edges of solids.

Various exemplary embodiments of the systems and methods for increasing the image quality of a marked image and/or increasing marking speed according to this invention input higher resolution data than that which will be output in order to approximate the higher resolution edges of output solids while maintaining the printing speed of lower resolution output. A "solid" is a marked area of substantially uniform color or shade. Accordingly, when the edge of a solid exists on a high-resolution center, i.e., the edge of the solid is between pixels according to the higher resolution input data, but is within an output area according to the output spacing, an amount of marking material is deposited on an adjacent output area according to the output spacing, such that when the marking material is transferred and/or fused to a receiving medium it is spread partially into the output area containing the high-resolution edge. The spread marking material causes the transition from the marked area to the non-marked area to shift, thereby approximating the edge of the solid according to the higher resolution input data.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, wherein:

FIG. 12 shows an example of an image printed using a conventional method; and FIG. 13 shows an example of an image printed according to an exemplary embodiment of this invention.

DETAILED DESCRIPTION OF EXEMPLARY EMBODIMENTS

Figure 1:
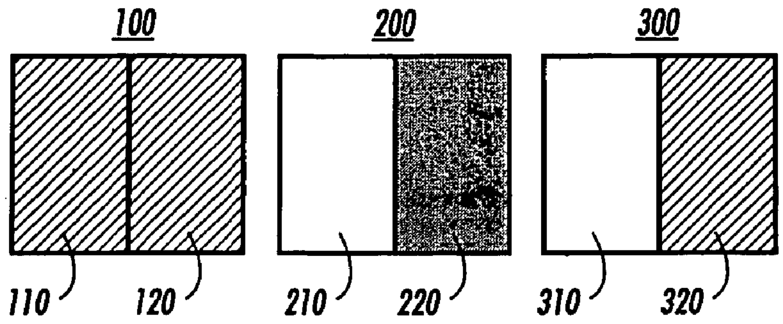
FIGS. 1 and 2 show situations in which input high-resolution data indicates that there is a single high-resolution line.

Various exemplary embodiments of the systems and methods according to this invention input higher resolution data, e.g., data having a smaller output spacing than the output spacing of the data that will be output. By outputting data with a larger output spacing, a significant increase in output speed is possible. Various exemplary embodiments of the systems and methods according to this invention utilize the high-resolution input data to adjust the amount of marking material output to imitate higher resolution output. In this manner, the output speed may be increased while reducing conventional loss of output quality. Because the effects of poor resolution are most apparent along the edges of solids, the various exemplary embodiments of the systems and methods according to this invention utilize the input high-resolution data to imitate high-resolution output along the edges of solids.

FIGS. 1-10 show a number of situations in which one exemplary embodiment of a method according to this invention adjusts the amount of output marking material based on the input high-resolution data to imitate high-resolution output at a larger output spacing. For ease of explanation, in the exemplary embodiment shown in FIGS. 1-10, the output is black and white, i.e., it is to be reproduced by depositing black and color marking material on a white substrate. Therefore, any pixel within the image data will be assigned a value of either black or white. Nevertheless, the marking material to produce black will include color marking material as well. Therefore, the amount of marking material used at transitions can be adjusted by varying the amount of color marking material and/or varying the amount of black marking material. The amount of color ink printed in the interior of a solid black region is chosen to insure a uniform dark area. At the edges of solids, the amount is chosen to insure the distance that the transition between the solid and background will move as a result of the marking process. Thus, the amount of colored marking material might be chosen so that the total amount of marking material is substantially consistent for edges which continue over many scan lines or across at least two adjacent output areas.

In various exemplary embodiments, the amount of marking material is measured as drops ejected from a print head. For example, for some edge transitions the amount of marking material could be chosen so that the final rendered output contains one black and one color drop where that color drop is any one of the primary colors (or a total of 2 drops). Alternatively, a simple fraction (e.g. an average of 1½ or 1⅔ drops per pixel) may be used. Rendering to drops may be done by methods well known in art such as halftoning or error diffusion and preferably a method that considers all colors together such as vector halftoning or vector error diffusion. It should further be appreciated that various exemplary embodiments may also utilize gray or color outputs.

For ease of explanation, this exemplary embodiment utilizes input high-resolution data that has decreased output spacing, in a direction parallel to a marking device's scan line (for example, the output data is 300 dpi×300 dpi and the input high-resolution data is 600 dpi×300 dpi). However, it should be appreciated that in other exemplary embodiments high-resolution data that has decreased output spacing in either or both directions may be used.

In all of FIGS. 1-10, the pixels 110, 120, 210, 220, 310, and 320 represent the high-resolution input data. For ease of explanation, the high-resolution pixels 110, 120, 210, 220, 310, and 320 are grouped according to the lower resolution output spacing. As discussed above, various exemplary embodiments of the systems and methods according to this invention increase output speed by increasing the output spacing. Therefore, according to this embodiment, marking material is only output for each group of high-resolution pixels. Group 100 represents the previous output spacing, group 200 represents the current output spacing, and group 300 represents the next output spacing. In this context "current" refers to the group for which an output value is currently being created, "previous" refers to a group adjacent to one side of the current group, and "next" refers to the group adjacent to an opposite side of the current group. Furthermore, in FIGS. 1-10, a black high-resolution pixel indicates that, according to the input data, that high-resolution pixel should be black and a white high-resolution pixel indicates that, according to the input data, that high-resolution pixel should be white. The crosshatched pixels are high-resolution pixels that are not considered by this embodiment of the method according to this invention, because they are not relevant to the analysis.

It should be appreciated that other embodiments may consider one or more input high-resolution pixels before the previous output spacing and after the next output spacing therefore enabling identification of additional cases such as 3 and 4 high-resolution pixel wide lines and transition adjustments that are more than one output spacing wide. In addition, the consideration of input high-resolution pixels in previous or subsequent scan lines could enable identification of corners and steps in an edge, which could then be handled as different cases requiring differing amounts of marking material.

Figure 2:
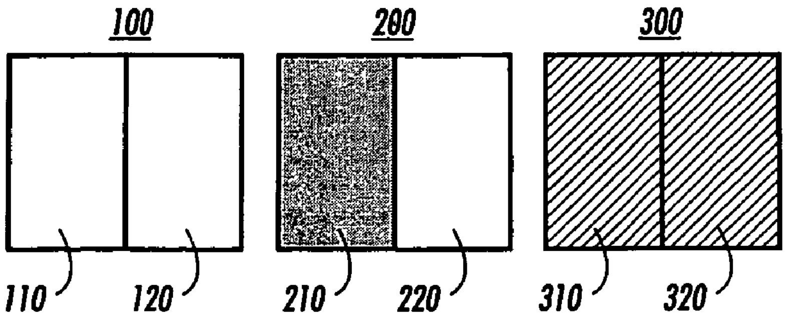

FIGS. 1 and 2 show situations in which the input high-resolution data indicates that there is a single high-resolution line. As discussed above, because the exemplary embodiments of the systems and methods according to this invention output marking material at a larger spacing in order to increase output speed, the various exemplary embodiments of the systems and methods according to this invention do not output a single high-resolution line according to slower conventional methods.

As such, when the input high-resolution data indicates that pixel 210 is white, pixel 220 is black, and pixel 310 is white, as shown in FIG. 1, this embodiment determines that a high-resolution line exists on pixel 220. Because marking material will be output at a spacing that does not allow pixel 220 to be individually printed according to conventional methods, this embodiment reduces the amount of marking material output at the spacing directly over group 200 so that the marked area, although shifted slightly to the left, will be thinner and lighter, thereby approximating a line printed at a higher resolution according to conventional methods.

Similarly, as shown in FIG. 2, when the input high-resolution data indicates that pixel 110 is white, pixel 120 is white, pixel 210 is black, and pixel 220 is white, this embodiment determines that a high-resolution line exists on pixel 210. Again, because marking material will be output at a spacing that does not allow pixel 210 to be individually printed according to conventional methods, this embodiment reduces the amount of marking material output at the spacing directly over group 200 so that the marked area, although shifted slightly to the right, will be thinner and lighter, thereby approximating a line printed at a higher resolution according to conventional methods.

Figure 3:
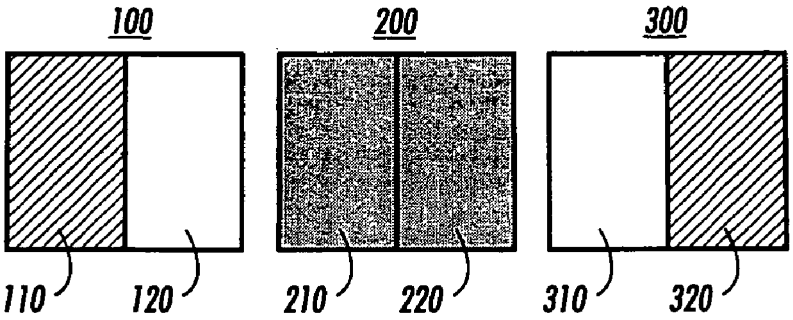
FIGS. 3 and 4 show situations in which input high-resolution data indicates that there is a single line at a resolution corresponding to the output spacing.
Figure 4:
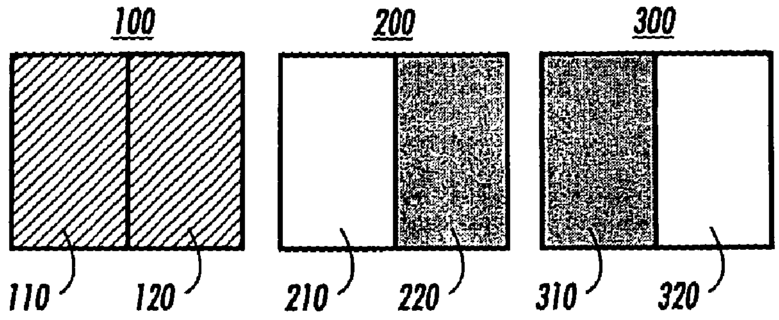

FIGS. 3 and 4 show situations in which the input high-resolution data indicates that there is a single line at a resolution corresponding to the output spacing of this embodiment. When the input high-resolution data indicates that pixel 120 is white, pixels 210 and 220 are black, and pixel 310 is white, as shown in FIG. 3, this embodiment determines that a single line at a resolution corresponding to the output spacing of this embodiment exists at the spacing directly over group 200. As such, because the thickness and location of the line corresponds to the output parameters of this embodiment, this embodiment outputs an amount of marking material necessary or desirable to define a line at the spacing directly over group 200. According to various exemplary embodiments of the method according to this invention, the amount of marking material used to define a line may be an amount either greater than or less than that used for the interior of a solid in order to darken the line and enhance the contrast between the line and the background or to lighten the line and preserve fine detail, respectively. Whether greater or lesser amounts of ink are used will depend on various factors, such as, for example, the output resolution, the marking physics of the ink, the media (e.g., paper, bond, transparencies, envelopes, and the like), and the printing process.

When the input high-resolution data indicates that pixel 210 is white, pixels 220 and 310 are black, and pixel 320 is white, as shown in FIG. 4, this embodiment determines that a single line at a resolution corresponding to the output spacing of this embodiment exists between the spacing directly over group 200 and the spacing directly over group 300. Because marking material will be output at a spacing that does not allow pixel 220 and 310 to be individually printed according to conventional methods, this embodiment outputs an amount of marking material at the spacing directly over group 200 necessary to define a line. As such, a line at a resolution corresponding to the output spacing may be output, although shifted slightly to the left, thereby approximating a line output at the same resolution over pixels 220 and 310 according to conventional methods. As in the example of FIG. 3, the amount of marking material used to define a line may be an amount either greater than or less than that used for the interior of a solid in order to darken the line and enhance the contrast between the line and the background or to lighten the line and preserve fine detail, respectively. Again, whether greater or lesser amounts of ink are used will depend on various factors, such as, for example, the output resolution, the marking physics of the ink, the media, and the printing process.

Figure 5:
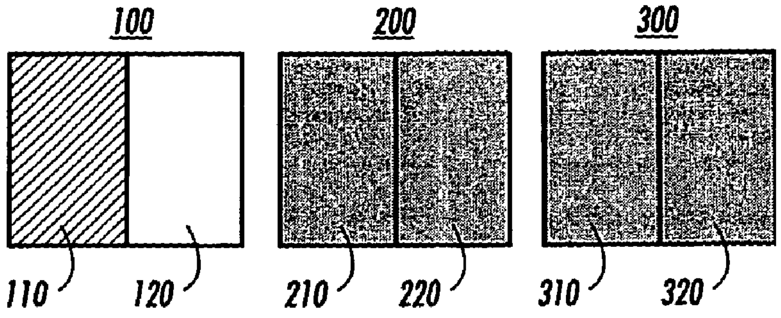
FIGS. 5 and 6 show two situations in which input high-resolution data indicates that there is an edge of a solid directly between the output spacing.
Figure 6:
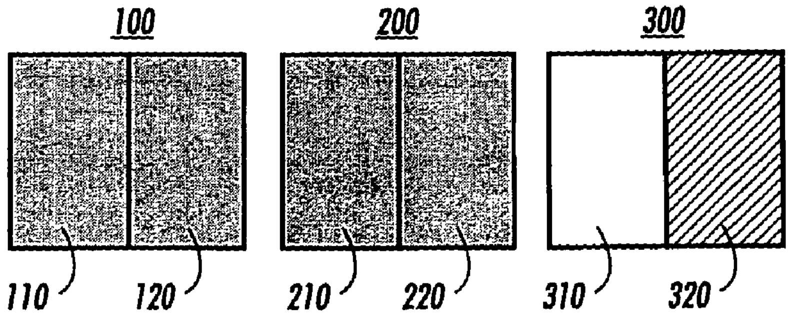

FIGS. 5 and 6 show situations in which the input high-resolution data indicates that there is an edge of a solid on a border directly between the output spacing of this embodiment. When the input high-resolution data indicates that pixel 120 is white, and pixels 210, 220, 310, and 320 are black, as shown in FIG. 5, this embodiment determines that an edge exists between pixels 120 and 210, e.g., between the output spacing directly over group 100 and the output spacing directly over group 200. As such, an amount of marking material necessary or desirable to define the edge may be output at the output spacing directly over group 200 at a resolution corresponding to the output spacing. According to various exemplary embodiments of the method according to this invention, the amount of marking material used to define an edge may be an amount greater than that used for the interior of a solid in order to darken the edge and enhance the contrast between the edge of the solid and the background or an amount less than that used for the interior in order to preserve fine detail. Whether greater or lesser amounts of ink are used will depend on various factors, such as, for example, the output resolution, the marking physics of the ink, the media, and the printing process.

Similarly, when the input high-resolution data indicates that pixels 110, 120, 210, and 220 are black and pixel 310 is white, as shown in FIG. 6, this embodiment determines that an edge exists between pixels 220 and 310, e.g., directly between the output spacing directly over group 200 and the output spacing directly over group 300. As such, an amount of marking material necessary or desirable to define the edge may be output at the output spacing directly over group 200 at a resolution corresponding to the output spacing. Again, according to various exemplary embodiments of the method according to this invention, an amount of marking material used to define an edge may be an amount greater than that used for the interior of a solid in order to darken the edge and enhance the contrast between the edge of the solid and the background or an amount less than that used for the interior in order to preserve fine detail. Again, whether greater or lesser amounts of ink are used will depend on various factors, such as, for example, the output resolution, the marking physics of the ink, the media, and the printing process.

Figure 7:
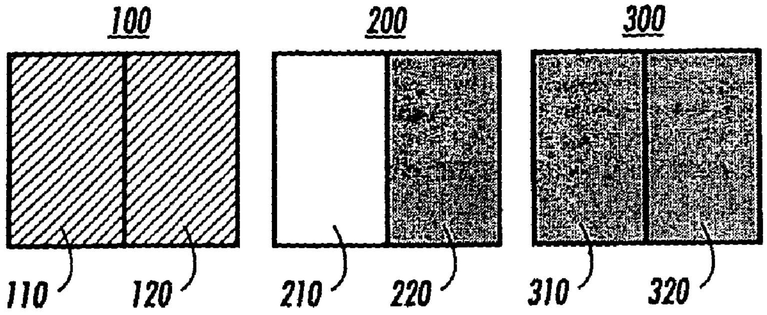
FIGS. 7 and 8 show two situations in which input high-resolution data indicates that there is an edge of a solid directly between two high-resolution pixels within the output spacing.
Figure 8:
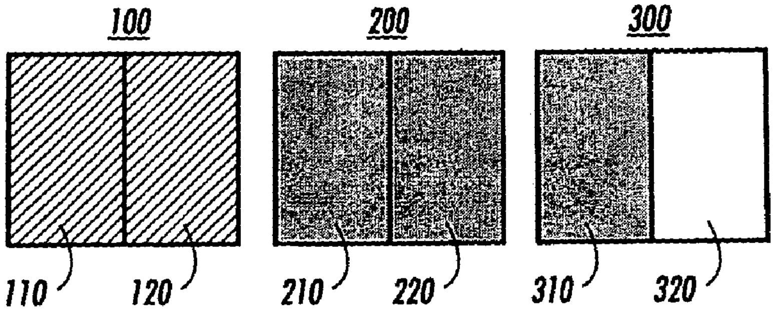

FIGS. 7 and 8 show situations in which the input high-resolution data indicates that there is an edge of a solid border between two high-resolution pixels within the output spacing of this embodiment. When the input high-resolution data indicates that pixel 210 is white, and pixels 220, 310, and 320 are black, as shown in FIG. 7, this embodiment determines that an edge exists between pixels 210 and 220, e.g., within the output spacing directly over group 200. Because marking material will not be output at a spacing that allows only pixel 220 to be individually printed according to conventional methods, this embodiment outputs an amount of marking material greater than would be output according to conventional methods at the spacing directly over group 300 such that when the marking material is transferred and/or fused to a receiving medium it is spread partially into the area of group 200 represented by high-resolution pixel 220. The spread marking material causes the transition from the marked area to the non-marked area to shift, thereby approximating the edge of the solid according to the higher resolution input data. It should be appreciated that, although the amount of marking material output will be greater than would be output according to conventional methods, the amount may vary depending on various factors, such as, for example, the output resolution, the marking physics of the ink, the media, and the printing process.

Similarly, when the input high-resolution data indicates that pixels 210, 220, and 310 are black and pixel 320 is white, as shown in FIG. 8, this embodiment determines that an edge exists between pixels 310 and 320, e.g., within the output spacing directly over group 300. Because marking material will be output at a spacing that does not allow only pixel 310 to be individually printed according to conventional methods, this embodiment may output an amount of marking material greater than would be output according to conventional methods at the spacing directly over group 200 such that when the marking material is transferred and/or fused to a receiving medium it is spread partially into the area of group 300 represented by high-resolution pixel 310. The spread marking material causes the transition from the marked area to the non-marked area to shift, thereby approximating the edge of the solid according to the higher resolution input data. Again, although the amount of marking material output will be greater than would be output according to conventional methods, the amount may vary depending on various factors, such as, for example, the output resolution, the marking physics of the ink, the media, and the printing process.

Figure 9:
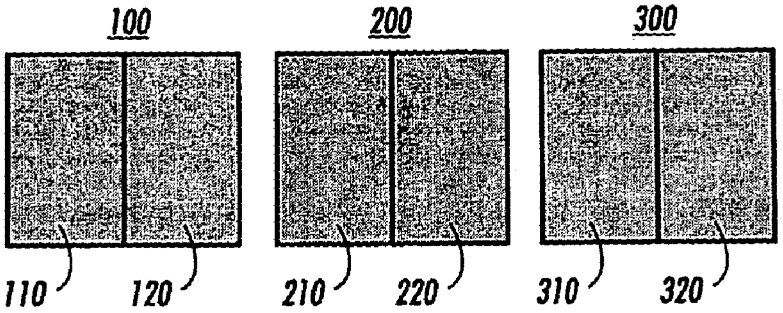
FIG. 9 shows a situation in which input high-resolution data indicates that there is an interior pixel to be output.

FIG. 9 shows a situation in which the input high-resolution data indicates that there is an interior pixel to be output. When the input high-resolution data indicates that all of pixels 110, 120, 210, 220, 310, are 320 are black, as shown in FIG. 9, this embodiment determines that the output spacing directly over group 200 is within a solid. As such, this embodiment outputs an amount of marking material required for the interior of a solid at the spacing directly over group 200. The amount of marking material used for the interior of a solid is preferably an amount sufficient to create a solid uniform dark output and may be more or less than the amount needed to provide the appropriate spreading of marking material at edges.

Figure 10:
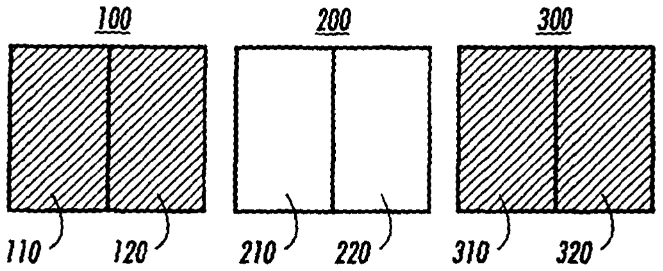
FIG. 10 shows a situation in which determine that no marking material is to be output for the current output area.

Finally, FIG. 10 shows a situation in which this embodiment determines that no marking material is to be output for the current output area. When the input high-resolution data indicates that pixels 210 and 220 are white, as shown in FIG. 10, this embodiment determines that the output spacing directly over group 200 is within a white area. As such, no marking material is output at the spacing directly over group 200.

It should be appreciated that when the current output area (i.e., the output spacing directly over group 200) is at the beginning or end of a scan line, one or more of the input high-resolution pixels that would have been considered, e.g., the "previous" or "next" group, may not exist. When this is the case, the non-existing pixel is assumed to be white.

Figure 11:
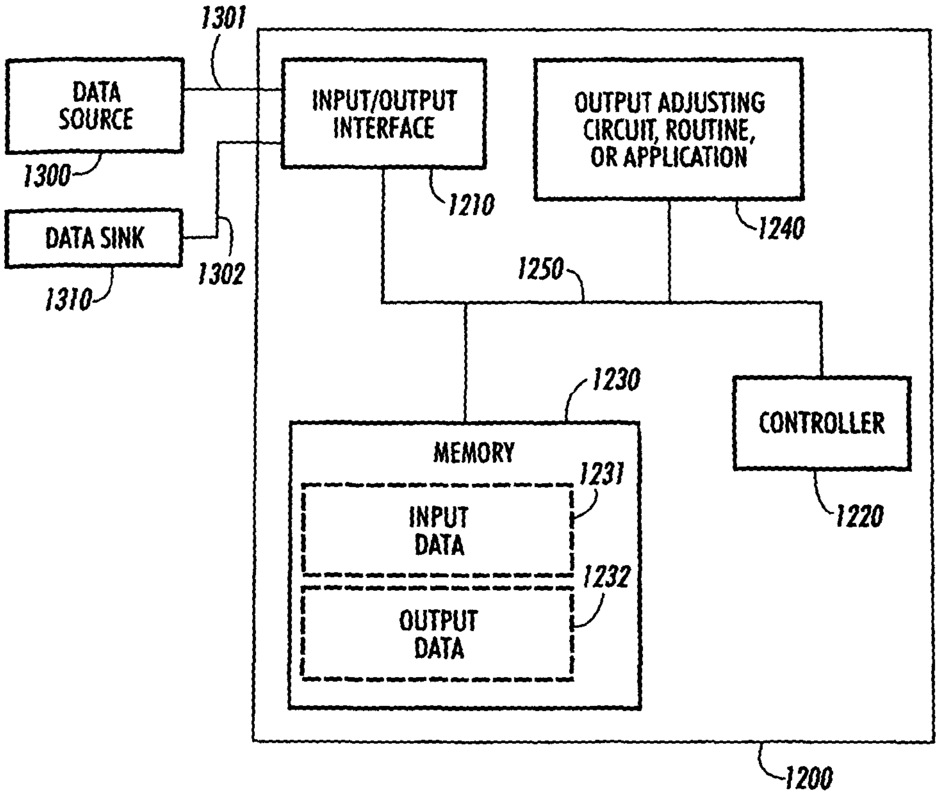
FIG. 11 shows an exemplary embodiment of a marking system according to this invention.

FIG. 11 shows an exemplary embodiment of a marking system 1200 according to this invention. As shown in FIG. 11, the system 1200 includes an input/output interface 1210, a controller 1220, a memory 1230, an output adjusting circuit, routine, or application 1240, each appropriately interconnected by one or more data/control buses and/or application programming interfaces 1250, or the like. The input/output interface 1210 is connected to one or more data sources 1300 over a link 1301.

In general, the data source 1300 can be a locally or remotely located laptop or personal computer, a personal digital assistant, a tablet computer, a device that receives and stores and/or transmits electronic image data, such as for example, a client or a server of a wired or wireless network, an intranet, an extranet, a local area network, a wide area network, a storage area network, the Internet (especially the World Wide Web), or the like. The data source 1300 can be any known or later-developed data source that is capable of providing image data to the input/output interface 1210 of the system 1200 according to this exemplary embodiment.

The data sink 1310 can be can be a locally or remotely located laptop or personal computer, a personal digital assistant, a tablet computer, a device that receives and stores and/or prints electronic image data, such as for example, a client or a server of a wired or wireless network, an intranet, an extranet, a local area network, a wide area network, a storage area network, the Internet, and especially a local printer, a network printer, or a print head. In general, the data sink 1310 can be any device that is capable of receiving and transmitting, storing, or printing the adjusted image data that is provided by the link 1302.

Each of the various links 1301 and 1302 can be implemented using any known or later-developed device or system for connecting the data source 1300 and the data sink 310 to the input/output interface 1210. In particular, the links 1301 and 1302 can each be implemented as one or more of a direct cable connection, a connection over a wide area network, a local area network, a connection over an intranet, a connection over an extranet, a connection over the Internet, a connection over any other distributed processing network or system, or an infrared, radio-frequency, or other wireless connection.

As shown in FIG. 11, the memory 1230 contains a number of different memory portions, including an input data portion 1231 and an output data portion 1232. The input data portion 1231 of the memory 1230 stores the input high-resolution image data. The output data portion 1232 of the memory 1230 stores the output data. The memory 1230 can also store any programs and/or data necessary for implementing the functions of the marking device 1200.

The memory 1230 shown in FIG. 11 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-writeable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

The output adjusting circuit, routine, or application 1240 accesses the input high-resolution image data, evaluates the high-resolution data and creates the output data.

In operation, the system 1200 receives high-resolution image data from one or more data sources 1300 across the link 1301 via the input/output interface 1210. Under control of the controller 1220, the high-resolution image data is stored in the input data portion 1231 of the memory 1230. Then, under control of the controller 1220, the high-resolution data is input to the output adjusting circuit, routine, or application 1240.

Alternatively, under control of the controller 1220, the high-resolution image data may be input directly from the input/output interface 1210 into the output adjusting circuit, routine, or application 1240.

It should be appreciated that the image data may come directly in the form of a raster image. Alternatively, it may come in a page description language (PDL) format and later processed to create a high-resolution raster image. Furthermore, the above described exemplary embodiments may be implemented on the whole raster image or only on certain types of objects such as text or graphics as identified by the PDL or other algorithms known in the art for identifying objects from a raster image.

The output adjusting circuit, routine, or application 1240 evaluates the high-resolution data and, depending on the results of the evaluation, creates adjusted output data with a greater output spacing than the high-resolution data. For instance, if for a certain group of high-resolution pixels that constitute an output area according to the output spacing of the output data, according to the low-resolution data, the output adjusting circuit, routine, or application 1240 determines that the first high-resolution pixel within the output area is white, the next high-resolution pixel within the output area is black, and the first high-resolution pixel in the next output area is white, (e.g., as shown in FIG. 1), then the output adjusting circuit, routine, or application 1240 creates output data wherein the amount of marking material output at will result in output that is thinner and lighter, thereby approximating a line printed at a higher resolution according to conventional methods.

Similarly, the output adjusting circuit, routine, or application 1240 may create output data wherein the amount of marking material output for the output area is thinner and lighter when, as shown in FIG. 2, the first high-resolution pixel and the next high-resolution pixel of the previous output area according to the output spacing are white, the first high-resolution pixel of the output area is black, and the next high-resolution pixel of the output area is white.

Furthermore, the output adjusting circuit, routine, or application 1240 may create output data to define a line at a location corresponding to the output spacing and a resolution corresponding to the output spacing, when it determines that, as shown in FIG. 3, a second high-resolution pixel within a previous output area is white, both high-resolution pixels within a current output area are black, and a first high-resolution pixel within a next output area is white.

Similarly, the output adjusting circuit, routine, or application 1240 may create output data to define a line at a location corresponding to the output spacing and a resolution corresponding to the output spacing, when it determines that, as shown in FIG. 3, a first high-resolution pixel of a previous output area according to the output spacing is white, a next high-resolution pixel of the previous output area is black, a first high-resolution pixel of a current output area is black, and a next high-resolution pixel of a current output area is white.

The output adjusting circuit, routine, or application 1240 may create output data to define an edge at a location corresponding to the area between output areas according to the output spacing, when it determines that, as shown in FIGS. 4 and 5, either the second high-resolution pixel of a previous output area is white, both high resolution pixels of a current output area are black, and both high resolution pixels of a next output area are black, or both high resolution pixels of a previous output area are black, both high resolution pixels of a current output area are black, and the first high-resolution pixel of a next output area is white.

The output adjusting circuit, routine, or application 1240 may create output data to define an edge at a location corresponding to the area between two high resolution pixels that are within the same output area according to the output spacing, when it determines that, as shown in FIGS. 7 and 8, either a first high-resolution pixel of a previous output area is white, a second high-resolution pixel of a previous output area is black, and both high resolution pixels of a current output area are black, or both high resolution pixels of a current output area are black, a first high-resolution pixel of a next output area is white, and a second high-resolution pixel of a next output area is black.

Finally, the output adjusting circuit, routine, or application 1240 will create output data reflecting an interior area when, as shown in FIG. 9, a first and next high-resolution pixel of a previous output area are black, a first and next high-resolution pixel of a current output area are black, and a first and next high-resolution pixel of a next output area are black.

The final output data consists of an amount of each color to be deposited for the group of high-resolution pixels that make up each output area according to the output spacing. The amount could be, for example, a single unit for each color or multiple units per color depending on the details of the marking process. Again, it should be appreciated that, in various exemplary embodiments, the amount of marking material is measured as drops ejected from a print head. Rendering to drops may be done by methods well know in art such as halftoning or error diffusion and preferably a method that considers all colors together such as vector halftoning or vector error diffusion.

After the output adjusting circuit, routine, or application 1240 has evaluated the input high-resolution data and created output data, the input high-resolution data and output data, under control of the controller 1220, are respectively returned to the input data portion 1231 and the output data portion 1232 of the memory 1230. Then, under control of the controller 1220, the output data is output to the input/output interface, across the link 1302, to the data sink 1310. Alternatively, the output data may be output, under control of the controller 1220, directly from the output adjusting circuit, routine, or application 1240 to the input/output interface, across the link 1302, to the data sink 1310.

It should be appreciated that, depending on cost or other design constraints, one or more of the above-described elements of the system 1200 may be combined into a single element or divided into multiple elements where appropriate.

It should also be appreciated that the above-described system may be incorporated into a marking engine such as a solid or liquid ink-jet printer, a facsimile machine, a digital copier, or any other now-known or later-developed device for marking an image using liquid or solid marking ink.

Furthermore, it should be appreciated that even though, for the sake of simplicity, the above-described embodiments of the systems and methods according to this invention were described using high-resolution data that is finer only in a direction parallel to the scan line, high-resolution data may be used that is finer in each direction.

It should be appreciated that, for the sake of simplicity, the above-described embodiments have been described by using high-resolution data that is twice as fine as the output area (i.e., two high-resolution pixels per output area). However, the same principle may be applied to high-resolution data wherein more high-resolution pixels exist within an output area. In such a situation, the difference would be a larger number of output values with varying amounts of marking material. For instance, a line that is two high-resolution pixels wide within a five pixel wide output area would be approximated by a smaller amount of marking material than a line that is three high-resolution pixels wide within a five pixel wide output area. Similarly, a larger amount of marking material would be output on an output area to approximate an edge of a solid that is three high-resolution pixels within an adjacent five-pixel-wide output area, than to approximate an edge of a solid that is only two high-resolution pixels wide within an adjacent five-pixel-wide output area.

Still further, although the above-described embodiments create output data to approximate the high-resolution input data at a larger output spacing, many more adjustment values may be used. For instance, when it is determined that the current low-resolution pixel is a corner pixel, a known adjustment value may be used. Similarly, when it is determined that the current low-resolution pixel is part of a diagonal line, another known adjustment value may be used.

It should be appreciated that although, for ease of explanation, the above-described embodiments of the systems and methods according to this invention have been described using pixel values of either black or white, various exemplary embodiments may consider various grey or non-neutral color values as well. For instance, rather than determining whether a pixel is black or white, it would be determined whether a pixel is lighter or darker than an adjacent pixel. Furthermore, the various adjustment values could be determined based on the difference between two adjacent colors. When two solids of very different colors (i.e., one very dark and one very light) are adjacent to one another, the adjustment values would be skewed to provide a substantial amount of edge differentiation (e.g., more ink for improved contrast and high-resolution approximation). When two solids of closer shades of grey are adjacent to one another, the adjustment values would be skewed to provide less edge differentiation (e.g., less ink since less contrast and high-resolution approximation is necessary). Below a certain threshold, difference between the colors there would be no enhancement. The enhancement in the simplest form would be linearly scaled from the threshold to the maximum enhancement (when the colors are black and white), though other functional forms could also be used.

It should also be appreciated that the resolutions of the different inks could be different. For example, ink jet systems often have higher resolution black capabilities than they do in the individual colors. Thus, the amount of color ink can be determined based on high-resolution data similar to the example above, while the black ink is actually printed according to high-resolution data.

It should also be appreciated that the exemplary embodiments of the systems and methods according to this invention are not limited to creating data that will be immediately output (e.g., that will immediately be used to determine an amount of marking material to be output), but rather may be saved as values for later rendering.

Finally, FIG. 12 is an enlarged view of text printed by a conventional four-color printing system. FIG. 13 is an enlarged view of the same text printed by a four-color printing system according to this invention.

While this invention has been described in conjunction with the exemplary embodiments outlined above, various alternatives, modifications, variations, and/or improvements may be possible. Accordingly, the exemplary embodiments of the invention, as set forth above, are intended to be illustrative, not limiting. Various changes may be without departing from the spirit and scope of the invention.

What is claimed is:

1. A method for reducing trade-off between image quality and marking speed, comprising:

an image processing and output device that performs the steps of:

evaluating high-resolution data at the pixel level;

identifying locations of different types of output based on the high resolution data;

automatically creating a unique output value for each corresponding marking output spacing based on the evaluation of the high-resolution data at the pixel level for each corresponding marking output spacing and marking output spacings adjacent to the marking output spacing for which the output value is being created, each marking output spacing being larger than a pixel evaluated during the evaluation of the high-resolution data at the pixel level;

choosing, for each created output value, an amount of marking material to be used so that a final marking output provides transitions approximating the evaluated high-resolution data at the pixel level, wherein each created output value comprises a black value and at least one color value, the at least one color value to be output beneath the black value, for each created output value, choosing the amount of marking material comprises selecting an amount of color marking material for each at least one color value based on the type of media on which the marking material will be output; and outputting the amount of marking material chosen for each created output value to a medium, wherein at least two different output values are created and associated with marking output spacings, and wherein choosing, for each created output value, the amount of marking material comprises selecting an amount of color marking material for each at least one color value based on the larger marking output spacing.

2. The method of claim 1, wherein choosing, for each created output value, the amount of marking material comprises selecting an amount of color marking material for each at least one color value based on a type of transition.

3. The method of claim 2, wherein the amount of marking material is measured in drops.

4. The method of claim 3, wherein selecting the amount of color marking material comprises selecting only one drop of each color per output area.

5. The method of claim 3, wherein selecting the amount of color marking material comprises selecting more than one drop of each color per output area.

6. The method of claim 2, wherein choosing, for each created output value, the amount of marking material is based at least in part on halftoning.

7. The method of claim 6, wherein the halftoning is based on a color vector-based algorithm.

8. The method of claim 2, wherein choosing, for each created output value, the amount of marking material is based at least in part on error diffusion.

9. The method of claim 2, wherein selecting the amount of color marking material comprises selecting an amount of color marking material for each at least one color value to give a substantially consistent total amount of color marking material for at least a same type of transition.

10. The method of claim 2, wherein selecting the amount of color marking material comprises selecting an amount of color marking material for each at least one color value to give a substantially consistent total amount of color marking material for a same type of transition across at least two adjacent output areas.

11. The method of claim 1, wherein the transitions comprise transitions that occur within an output area defined by the larger marking output spacing and transitions that occur between output areas defined by the larger marking output spacing.

12. The method of claim 11, wherein the amount of marking material chosen for an output value that defines a transition within an adjacent output area is greater than the amount of marking material chosen for an output value that defines a transition between output areas.

13. The method of claim 1, wherein the transitions comprise transitions between a background and one- and two-pixel-wide lines according to the high-resolution data.

14. The method of claim 1, wherein identifying the locations of different types of output based on the high-resolution data comprises processing the image by scanlines.

15. The method of claim 14, wherein the evaluated high-resolution data is twice the resolution according to the larger marking output spacing.

16. The method of claim 14, wherein identifying the locations of different types of output based on the high-resolution data comprises evaluating, for each output value at least a portion of a previous scanline according to the high-resolution data.

17. The method of claim 14, wherein identifying the locations of different types of output based on the high-resolution data comprises evaluating, for each output value at least a portion of a next scanline according to the high-resolution data.

18. The method of claim 17, wherein the final output transitions include transitions between a background and a corner according to the high-resolution data.

19. The method of claim 1, wherein:

identifying the locations of different types of output based on the high resolution data, comprises identifying types of objects to be printed; and creating an output value based on the evaluation of the high-resolution data comprises creating an output value only for certain types of objects.

20. The method of claim 19, wherein one of the certain types of objects is text.

21. A system for reducing trade-off between image quality and image marking speed, comprising:

an image processing and output device comprising:

an image output adjusting circuit that causes the image processing and output device to:

evaluate input high-resolution data for an image at the pixel level;

identify locations of different types of output based on the high resolution data;

automatically create a unique output value for each corresponding marking output spacing based on the evaluation of the high-resolution data at the pixel level for each corresponding marking output spacing and marking output spacings adjacent to the marking output spacing for which the output value is being created, each marking output spacing being larger than a pixel evaluated during the evaluation of the high-resolution data at the pixel level;

choose, for each created output value, an amount of marking material to be used so that the final marking output provides transitions approximating the input resolution, wherein each created output value comprises a black value and at least one color value, the at least One color value to be output beneath the black value, for each created output value, choosing the amount of marking material comprises selecting an amount of color marking material thr each at least one color value based on the type of media on which the marking material will be output; and output to a medium the amount of marking material chosen to be used, wherein at least two different output values are created and associated with marking output spacings, and wherein choosing, for each created output value, the amount of marking material comprises selecting an amount of color marking material for each at least one color value based on the larger marking output spacing.

22. An ink jet printer comprising:

an image output adjusting circuit that causes the ink jet printer to:

evaluate input high-resolution data for an image at the pixel level;

identify locations of different types of output based on the high resolution data;

automatically create a unique output value for each corresponding marking output spacing based on the evaluation of the high-resolution data at the pixel level for the corresponding marking output spacing and the marking output spacings adjacent to the marking output spacing for which the output value is being created, each marking output spacing being larger than a pixel evaluated during the evaluation of the high-resolution data at the pixel level;

choose, for each output value, an amount of marking material to be used so that the final output provides transitions approximating the input resolution, wherein each created output value comprises a black, value and at least one color value, the at least one color value to be output beneath the black value, for each created output value, choosing the amount of marking material comprises selecting an amount of color marking material for each at least one color value based on the type of media on which the marking material will be output; and output to a medium the amount of marking material chosen to be used, wherein at least two different output values are created and associated with output spacings, and wherein choosing, for each created output value, the amount of marking material comprises selecting an amount of color marking material for each at least one color value based on the larger marking output spacing.

* * * * *